United States Patent

Piao (10) Patent No.: US 12,094,166 B2
(45) Date of Patent: Sep. 17, 2024

(54) LEARNING DATA GENERATION APPARATUS, LEARNING DATA GENERATION METHOD, AND RECORDING MEDIUM

(71) Applicant: NEC Corporation, Tokyo (JP)

(72) Inventor: Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 17/765,484

(22) PCT Filed: Oct. 8, 2019

(86) PCT No.: PCT/JP2019/039699
§ 371 (c)(1),
(2) Date: Mar. 31, 2022

(87) PCT Pub. No.: WO2021/070258
PCT Pub. Date: Apr. 15, 2021

(65) Prior Publication Data
US 2022/0366603 A1 Nov. 17, 2022

(51) Int. Cl.
*G06T 7/00* (2017.01)
*G06T 7/73* (2017.01)
*G06V 10/22* (2022.01)

(52) U.S. Cl.
CPC .............. *G06T 7/75* (2017.01); *G06V 10/225* (2022.01); *G06T 2207/20081* (2013.01); *G06V 2201/07* (2022.01)

(58) Field of Classification Search
CPC . G06T 7/75; G06T 2207/20081; G06T 11/60; G06T 11/00; G06V 10/225; G06V 2201/07; G06V 10/774; G06V 10/25; G06V 10/82

USPC ......................................................... 382/103
See application file for complete search history.

(56) References Cited

U.S. PATENT DOCUMENTS

| 2008/0294315 A1* | 11/2008 | Breed | G06V 20/584 701/49 |
| 2012/0039541 A1* | 2/2012 | Fukui | G06F 18/24323 382/224 |
| 2020/0082224 A1* | 3/2020 | Sikka | G06F 18/2413 |

FOREIGN PATENT DOCUMENTS

JP 2014-085795 A 5/2014

OTHER PUBLICATIONS

International Search Report for PCT Application No. PCT/JP2019/039699, mailed on Dec. 24, 2019.

(Continued)

*Primary Examiner* — Neil R McLean
(74) *Attorney, Agent, or Firm* — Sughrue Mion, PLLC (57) ABSTRACT

A discriminative mode generation unit generates a discriminative model that discriminates a target object included in an image using a target object image, which includes the target object and to which a label of the target object is applied, and a non-target object image, which includes a non-target object. An interest area detection unit inputs the target object image to the discriminative model, and detects an interest area which is an area that is predicted to include the target object. A rectangle generation unit generates a rectangle circumscribing the target object based on the interest area. A learning data output unit outputs learning data including a label of the target object and the rectangle.

9 Claims, 9 Drawing Sheets (56) References Cited

OTHER PUBLICATIONS

Diba, A. et al., "Weakly Supervised Cascaded Convolutional Networks", Nov. 24, 2016, version vi, pp. 1-10, [retrieved on Dec. 6, 2019], Retrieved from the Internet: <URL:https://arxiv.org/abs/1611.08258vl> and <URL: https://arxiv.org/pdf/1611.08258vl.pdf>.

Eu Wern Teh et al., "Attention Networks for Weakly Supervised Object Localization", Proceedings of the British Machine Vision Conference (BMVC 2016), Sep. 2016, pp. 52.1 to 52.11, [online], [retrieved on Dec. 6, 2019], Retrieved from the Internet: <URL: http://www.bmva.org/bmvc/2016/papers/paper052/index.html> and <URL:http://www.bmva.org/bmvc/2016/papers/paper052/paper052.pdf>.

* cited by examiner

<CASE WHERE RECTANGLE CORRESPONDS TO ONLY PART OF TARGET OBJECT>

FEATURE MAP

MASK RECTANGLE

MASK IMAGE

REGENERATE RECTANGLE

LEARNING DATA GENERATION APPARATUS, LEARNING DATA GENERATION METHOD, AND RECORDING MEDIUM

This application is a National Stage Entry of PCT/JP2019/039699 filed on Oct. 8, 2019, the contents of all of which are incorporated herein by reference, in their entirety.

TECHNICAL FIELD

The present disclosure relates to a technique for generating correct answer data used in an object detection.

BACKGROUND ART

Recently, accuracies of an object recognition and an object detection have been dramatically improved by a development of deep learning. In order to learn a model using deep learning, sufficient learning data are essential. And, in order to ensure accuracies of the object recognition and the object detection, images in various environments are required as learning data. Conventionally, since an image including an object was captured in various environments and a work of correct answering was carried out manually for each of images, a large amount of time and labor were required in order to prepare learning data. From such a viewpoint, it is required to efficiently create learning data. Patent Document 1 discloses a technique for collecting images of different environments and training a discriminator using these images as training data.

PRECEDING TECHNICAL REFERENCES

Patent Document
  Japanese Laid-open Patent Publication No. 2014-85795

SUMMARY

Problem to be Solved

However, even in the technique of Patent Document 1, it is necessary to first capture a large number of images.

It is an object of the present disclosure to provide a method for efficiently generating learning data that can be used for learning of an object detection apparatus or the like without capturing images.

Means for Solving the Problem

In order to solve the above problems, according to an example aspect of the present disclosure, there is provided a learning data generation apparatus including:
  a discriminative model generation unit configured to generate a discriminative model that discriminates a target object included in an image using a target object image, which includes the target object and to which a label of the target object is applied, and a non-target object image, which includes a non-target object;
  an interest area detection unit configured to input the target object image to the discriminative model, and detect an interest area which is an area that is predicted to include the target object;
  a rectangle generation unit configured to generate a rectangle circumscribing the target object based on the interest area; and
  a learning data output unit configured to output learning data including a label of the target object and the rectangle.

According to another example aspect of the present disclosure, there is provided a learning data generation method including:
  generating a discriminative model that discriminates a target object included in an image using a target object image which includes the target object and to which a label of the target object is applied, and a non-target object image which includes a non-target object;
  inputting the target object image to the discriminative model, and detecting an interest area which is an area that is predicted to include the target object;
  generating a rectangle circumscribing the target object based on the interest area; and
  outputting learning data including a label of the target object and the rectangle.

According to still another example aspect of the present disclosure, there is provided a recording medium storing a program, the program causing a computer to perform a process including:
  generating a discriminative model that discriminates a target object included in an image using a target object image which includes the target object and to which a label of the target object is applied, and a non-target object image which includes a non-target object;
  inputting the target object image to the discriminative model, and detecting an interest area which is an area that is predicted to include the target object;
  generating a rectangle circumscribing the target object based on the interest area; and
  outputting learning data including a label of the target object and the rectangle.

Effect

According to the present disclosure, it is possible to efficiently generate learning data that can be used for learning of an object detection apparatus or the like without capturing images.

EXAMPLE EMBODIMENTS

In the following, example embodiments will be described with reference to the accompanying drawings.

Overview

In the example embodiments described below, learning data used for learning of an object detection apparatus are generated based on existing image data without capturing new images. In general, the object detection apparatus detects an area of one or more objects included in an image, and outputs a label of the object and a position of the area. A target object to be detected is predetermined. For instance, in a case where a "person", a "dog", or a "cat" is determined as an object, the object detection apparatus detects those three objects from an image, and outputs a label and a position of a target object in the image for each target object. In general, as the position of the target object, a rectangle indicating an area occupied by the target object in the image, specifically coordinates representing a rectangle circumscribing the target object is used.

In a case where the object detection apparatus is formed by a neural network, learning data, which include an image for learning, a label of an object included in the image, and a rectangle indicating a position of the object, are required to train an object detection model. Note that the learning data are also called training data. The learning data are usually performed by first capturing a large number of images each including a target object and then manually applying labels and rectangles to respective images; however, as described above, this work requires a great deal of time and effort.

Therefore, in the present example embodiment, the learning data are automatically generated. Specifically, in the present example embodiment, first, existing images to each of which a label is applied are collected, and a rectangle indicating a position of a target object is applied to each image, and thus learning data are generated. As the image to which the label is applied, an image disclosed on a website or the like may be used. For instance, in a case where the object is the "cat", image data of cats disclosed on the web can be collected by a web search or the like. The image thus obtained can be considered as an image already labeled "cat", which is the target object. However, since rectangle information indicating a position of the target object "cat" in the image is not included, a process for applying a rectangle to the image is required. Therefore, in the present example embodiment, the learning data are generated by collecting images each to which a label is applied and automatically generating a rectangle indicating a position of a target object for each image. By this collection, it is possible to save a trouble of capturing images and labeling the target object contained in the image, and it is possible to efficiently generate learning data. Also, by using images and the like disclosed on the web, it is possible to generate learning data using images captured in various environments.

First Example Embodiment

Hardware Configuration

Figure 1:
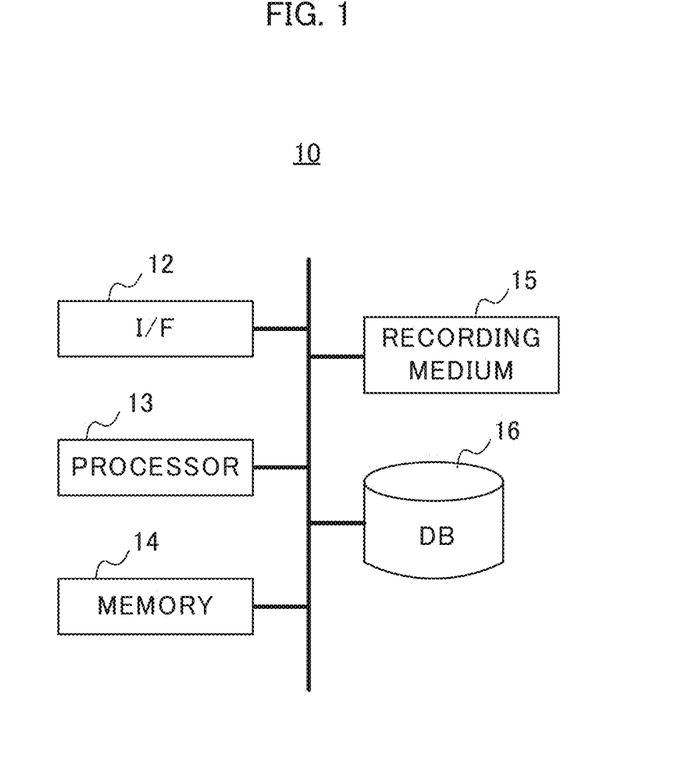
FIG. 1 illustrates a hardware configuration of a learning data generation apparatus according to a first example embodiment.

FIG. 1 is a block diagram illustrating a hardware configuration of a learning data generation apparatus according to a first example embodiment. As illustrated, a learning data generation apparatus 10 includes an interface (I/F) 12, a processor 13, a memory 14, a recording medium 15, and a database (DB) 16.

The interface 12 performs to input and output data to and from an external apparatus. Specifically, the interface 12 is used to input an image that is the basis of training data to the learning data generation apparatus 10 or to output the learning data generated by the learning data generation apparatus 10.

The processor 13 is a computer such as a CPU (Central Processing Unit) or a GPU (Graphics Processing Unit) with the CPU, and controls the entire learning data generation apparatus 10 by executing a program prepared in advance. Specifically, the processor 13 executes a learning data generation process described later.

The memory 14 is formed by a ROM (Read Only Memory), a RAM (Random Access Memory), and the like. The memory 14 stores a discriminative model for use by the learning data generation apparatus 10. Also, the memory 14 is used as a working memory during executions of various processes by the processor 13.

The recording medium 15 is a non-volatile and non-transitory recording medium such as a disk-shaped recording medium or a semiconductor memory, and is formed to be detachable from the learning data generation apparatus 10. The recording medium 15 records various programs to be executed by the processor 13. In a case where the learning data generation apparatus 10 executes various types of processes, programs recorded on the recording medium 15 are loaded into the memory 14 and executed by the processor 13.

The database 16 stores image data to be used to generate the learning data. In addition to the above, the learning data generation apparatus 10 may include an input apparatus or a display unit such as a keyboard or a mouse for a user to perform instructions or inputs.

Functional Configuration

Figure 2:
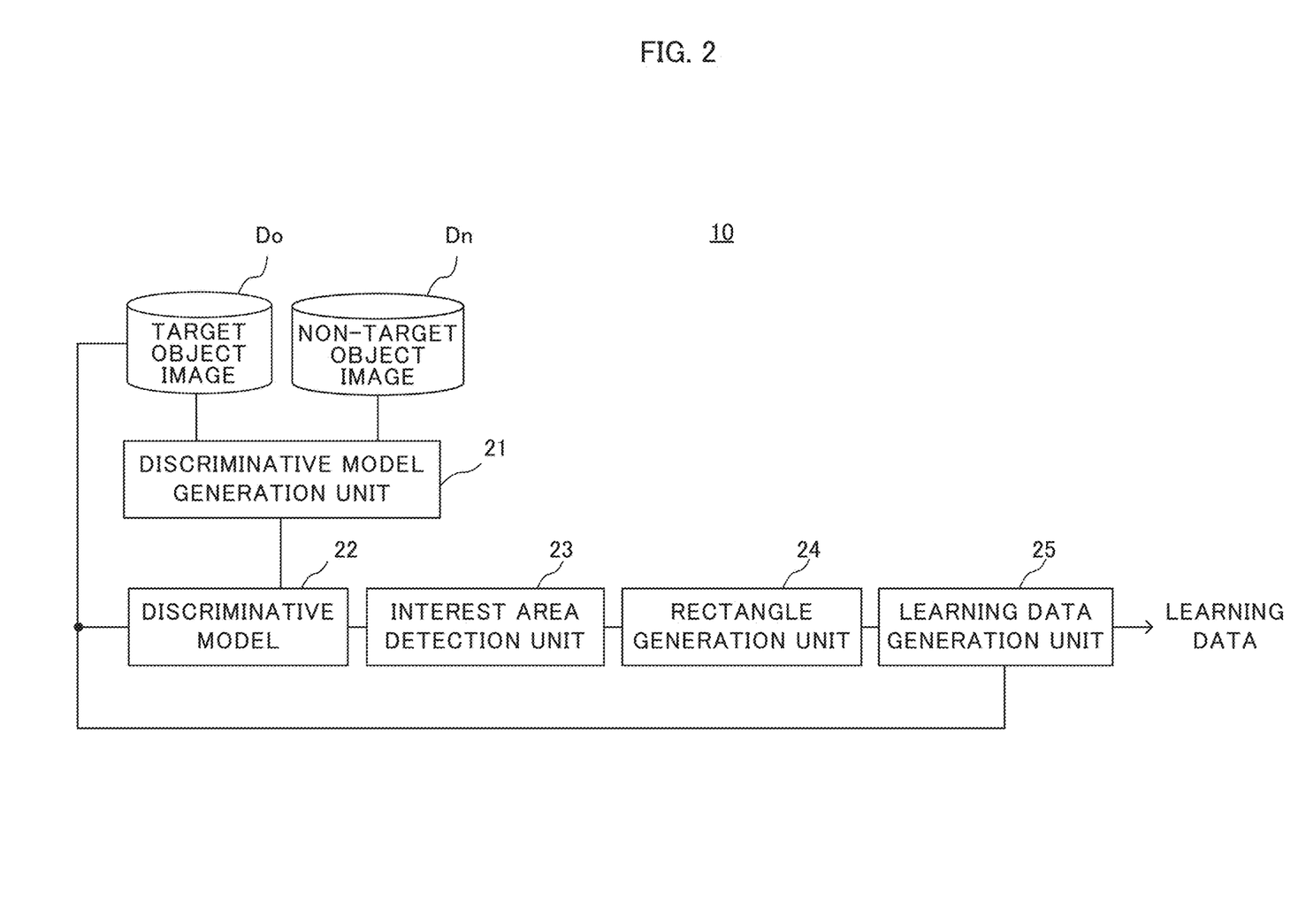
FIG. 2 illustrates a functional configuration of the learning data generation apparatus according to the first example embodiment.

Next, a functional configuration of the learning data generation apparatus will be described. FIG. 2 is a block diagram illustrating the functional configuration of the learning data generation apparatus according to the first example embodiment. As illustrated, the learning data generation apparatus 10 includes a discriminative model generation unit 21, a discriminative model 22, an interest area detection unit 23, a rectangle generation unit 24, and a learning data generation unit 25.

A target object image Do that is an image including a target object and a non-target object image Dn that is an image including an object other than the target object (hereinafter, referred to as "non-target object") are input to the discriminative model generation unit 21. Here, a label indicating a target object is applied to the target object image Do. For instance, in a case where the target object is the "cat", the target object image Do is collected as an image of a cat, and label information indicating the "cat" is added. On the other hand, the non-target object image Dn is an image including an object other than the target object, and the label may not be applied.

The discriminative model generation unit 21 generates the discriminative model 22 in order to discriminate a target object from an image. The discriminative model 22 is formed by using a neural network and is trained by the target object image Do and the non-target object image Dn. By training using the target object image Do and the non-target object image Dn, the discriminative model 22 can discriminate whether or not an object included in an input image is the target object.

When the discriminative model 22 is generated, the target object image Do including the target object is input to the discriminative model 22. The target object image Do to input is an image that is a basis of the learning data. The interest area detection unit 23 detects an interest area in the image using the discriminative model 22 in the state in which the target image Do is input. Here, the "interest area" is an area in which a target object is predicted to exist in an image. Specifically, the interest area detection unit 23 generates a feature map from the discriminative model 22 in the state in which the target object image Do is input. Here, the "feature map" is a map representing a feature amount of an image for the entire input image. Incidentally, the feature map can be acquired from a layer indicating the feature amount of the entire image in the neural network forming the discriminative model. As an instance, the feature map can be obtained by a CAM (Class Activation Mapping) using a GAP (Global Average Pooling) or the like. The interest area becomes an area where a value of the feature amount is greater in the feature map.

Figure 3:
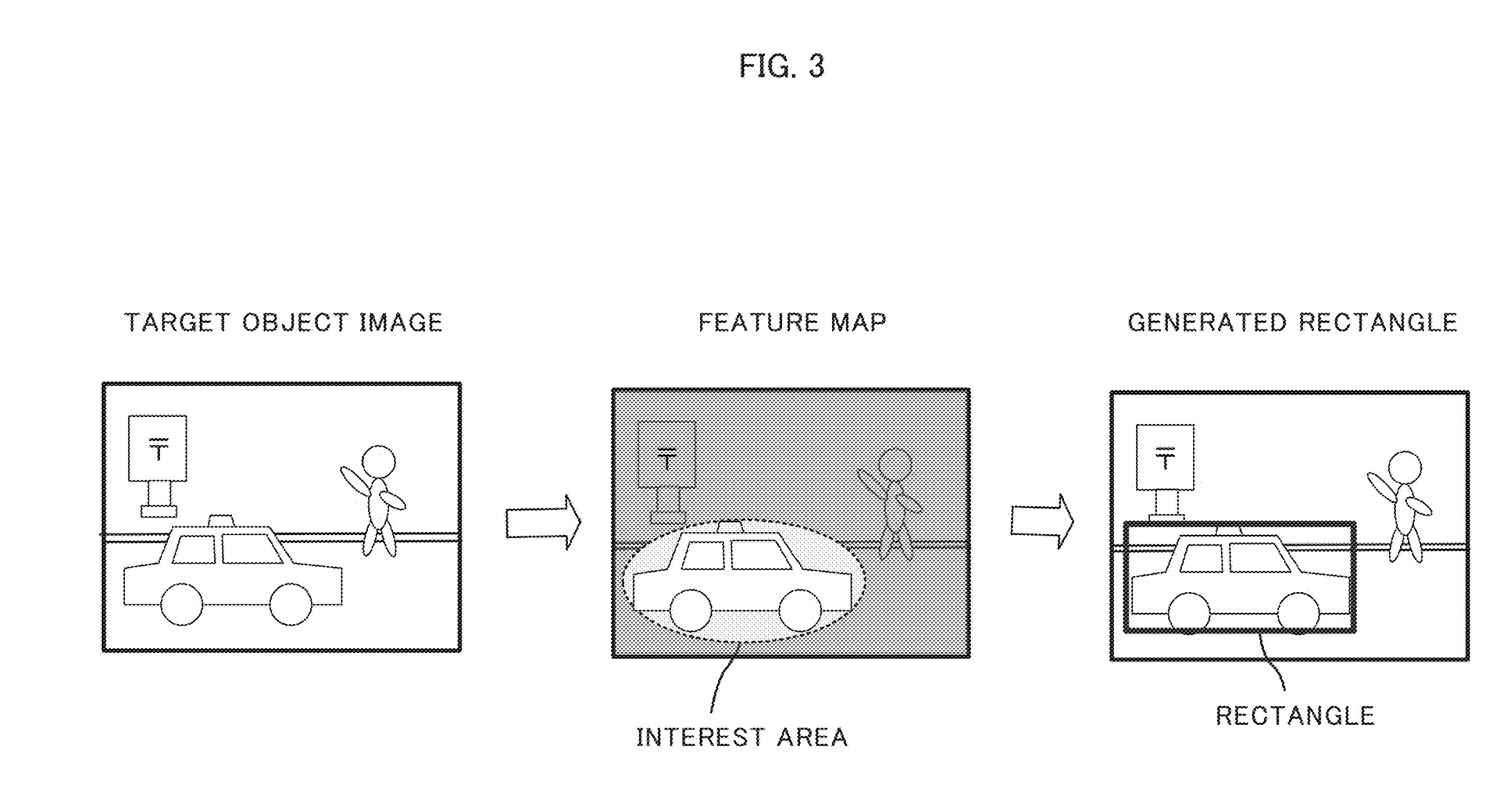
FIG. 3 illustrates an interest area and a rectangle with respect to a target object image.

FIG. 3 illustrates an example of the target object image Do. Now, assumed that the target object is the "car". The target object image of the car is input to the discriminative model 22, and the feature map is acquired. In this feature map, an area in which the value of the feature amount is greater (an area that is brightly displayed in FIG. 3) is detected as an interest area.

The rectangle generation unit 24 generates a rectangle corresponding to the interest area in the feature map. Specifically, the rectangle generation unit 24 generates a rectangle which circumscribes an area in which a value of the feature amount in the feature map is equal to or greater than a predetermined threshold value. In the example in FIG. 3, an area that is brightly displayed in the feature map is the interest area, and the rectangle generation unit 24 generates a rectangle circumscribing the interest area. This rectangle becomes a rectangle indicating a position of a target object in the target object image Do. The rectangle generation unit 24 supplies the generated rectangle to the learning data generation unit 25.

The learning data generation unit 25 generates and outputs the learning data. The target object image Do is input to the learning data generation unit 25, and the learning data generation unit 25 outputs, as the learning data, the label originally applied to the target object image Do and the rectangle generated by the rectangle generation unit 24.

Learning Data Generation Process

Figure 4:
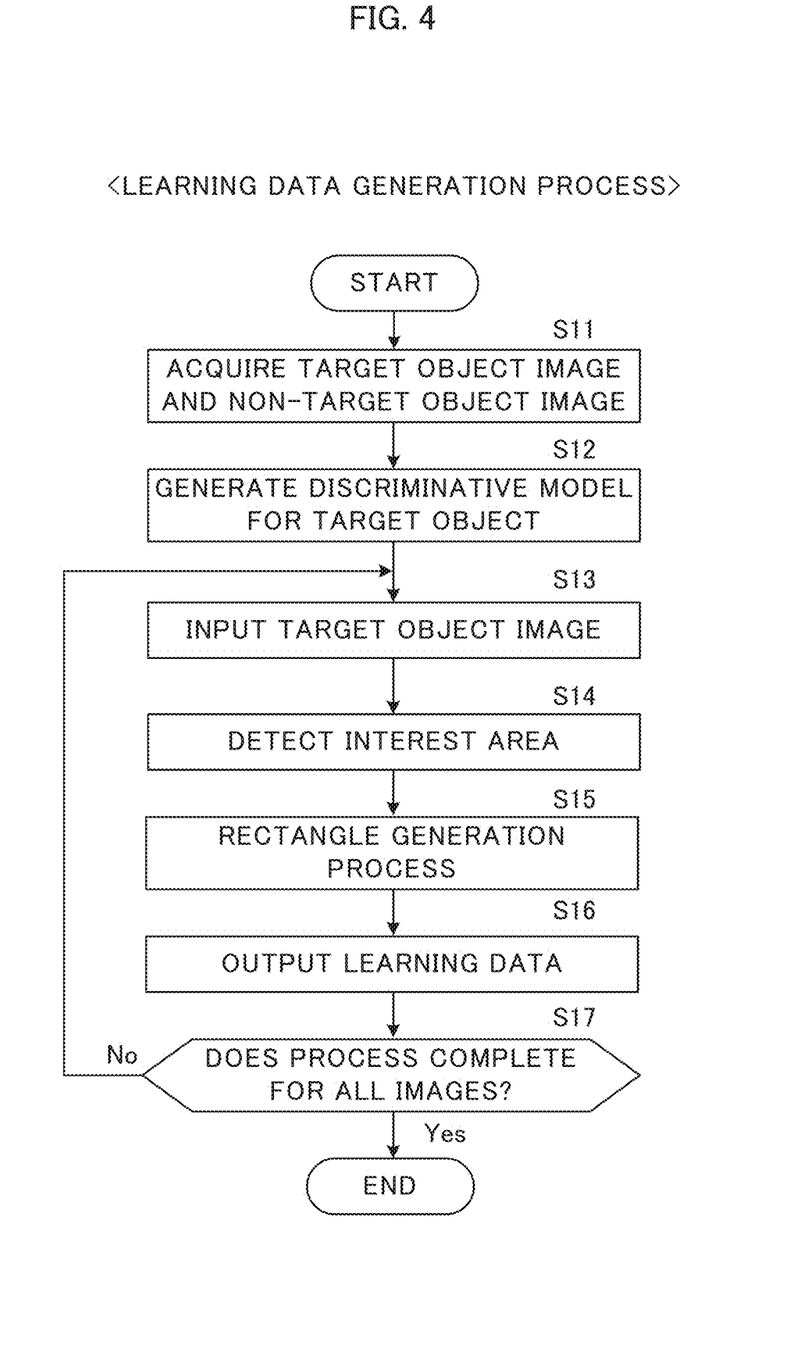
FIG. 4 is a flowchart of the learning data generation apparatus according to the first example embodiment.

Next, the learning data generation process performed by the learning data generation apparatus 10 will be described according to the first example embodiment. FIG. 4 is a flowchart of the learning data generation process according to the first example embodiment. This process is conducted by the processor 13, which is depicted in FIG. 1, executes a pre-prepared program, and operates as each element illustrated in FIG. 2.

First, the discriminative model generation unit 21 acquires the target object image Do and the non-target object image Dn (step S11), and generates the discriminative model 22 using these images (step S12) When the discriminative model 22 is generated, the target object image Do is input to the discriminative model 22 (step S13). The interest area detection unit 23 generates a feature map from the discriminative model 22 to detect an interest area (step S14), and the rectangle generation unit 24 generates a rectangle circumscribing the interest area (step S15). After that, the learning data generation unit 25 generates learning data including a label applied to the target object image Do and the rectangle generated by the rectangle generation unit 24, and outputs the learning data (step S16).

Next, it is determined whether or not the learning data generation process has been completed for all object images Do which are prepared in advance (step S17). When the learning data generation process has not been completed for all object images (step S17: No), the process returns to step S13, and processes of steps S13 to 16 are performed for a next target object image Do. When the learning data generation process is completed for all the object images Do (step S17: Yes), the learning data generation process is terminated.

Second Example Embodiment

Next, a learning data generation apparatus will be described according to a second example embodiment. In the first example embodiment, the rectangle circumscribing the interest area in the feature map is output as the training data; however, in practice, the rectangle generated based on the interest area in the feature map may not correctly indicate a position of the target object. Specifically, the following two cases are considered.

(Case A) the Rectangle Corresponds to Only a Part of the Target Object.

Figure 5:
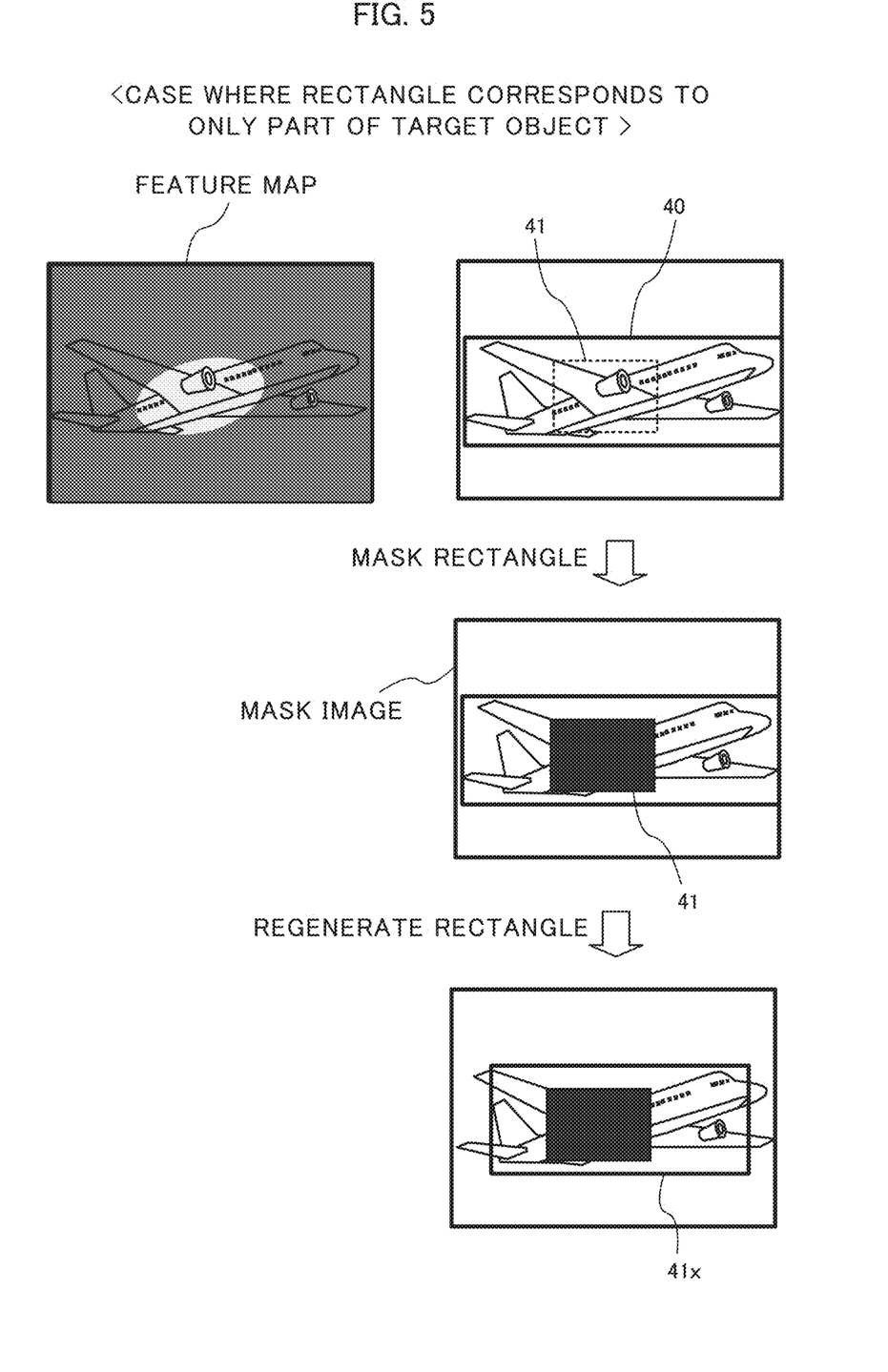
FIG. 5 illustrates a case example where the rectangle corresponds to only a part of a target object.

FIG. 5 illustrates an example of a target object image in this case. In this example, the target object is assumed to be an "airplane". In a case of this target object image, a correct rectangle is a rectangle 40 corresponding to the entire airplane. However, in the feature map obtained by inputting the object image into the discriminative model, only a part of the airplane (a part at a base of a right wing) is detected as the interest area, and a rectangle 41 acquired as a result corresponds to only a part of the airplane.

In such a case, the learning data generation apparatus may perform an enlargement process of the rectangle illustrated in FIG. 5. In practice, the learning data generation apparatus cannot know whether or not the rectangle 41 corresponds to the case A; however, it is assumed that there is a possibility corresponding to the case A, and the following enlargement process is executed for all the acquired rectangles.

First, the learning data generation apparatus masks an area of the acquired rectangle 41 and generates a mask image. Specifically, all the feature amount of the feature map in the area of the rectangle 41 are replaced with "0" or sufficiently small values. Next, the learning data generation apparatus inputs the mask image to the discriminative model again, and determines whether or not the discriminative model recognizes the mask image as the airplane. Specifically, the learning data generation apparatus determines whether or not a degree of reliability for a discrimination result as the airplane by the discriminative model is equal to or greater than a predetermined value.

In a case of the example in FIG. 5, that is, in a case where a rectangle corresponds to the case A, since it is considered that features as the airplane exist in areas other than the area of the rectangle 41 on the feature map and an area larger than the rectangle 41 corresponds to the airplane, the mask image is also likely to be recognized as the airplane. Accordingly, when the discriminative model recognizes the mask image as the airplane, the learning data generation apparatus generates the feature map based on the mask image, and regenerates a rectangle. By this regeneration, as illustrated in FIG. 5, a new rectangle 41x close to the correct rectangle 40 is acquired. On the other hand, when the discriminative model does not recognize the mask image as the airplane, since it is considered that there is no feature as the airplane other than the area of the rectangle 41, that is, the rectangle 41 does not correspond to the case A, the learning data generation apparatus adopts the original rectangle 41 and terminates this process.

(B) The Rectangle Contains a Plurality of Target Objects

Figure 6:
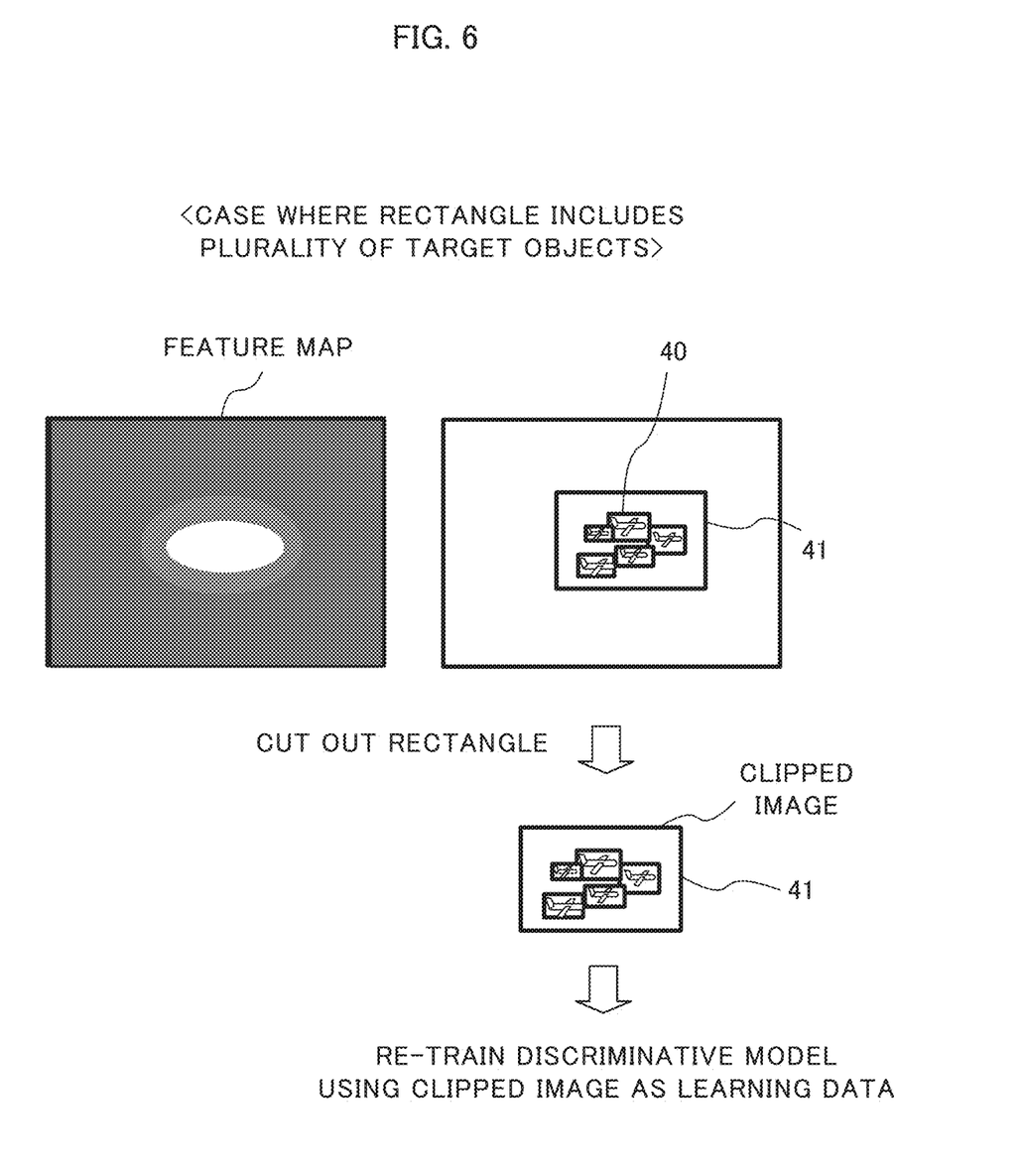
FIG. 6 illustrates a case example where the rectangle corresponds to a plurality of target objects.

FIG. 6 illustrates an example of a target object image in this case. In this example, a plurality of airplanes are flying together, and the entire area for the plurality of airplanes (five airplanes in this example) is detected as one rectangle 41. In such a case, ideally, it is desirable to be able to detect areas 40 of individual airplanes as rectangles.

In this case, the learning data generation apparatus may perform a rectangle reduction process as illustrated in FIG. 6. In practice, although the learning data generation apparatus cannot know whether or not the rectangle 41 corresponds to a case B, it is assumed that there is a possibility corresponding to the case B, and the following reduction process is executed for all of the acquired rectangles 41.

First, the learning data generation apparatus cuts out an area of the acquired rectangle 41 to generate a clipped image. After that, the clipped image is input to the discriminative model, and it is determined whether or not the discriminative model recognizes the clipped image as the airplane.

Since the clipped image is an image zoomed into the area of the rectangle 41 rather than the original image, in the case B, that is, in a case where the clipped image includes a plurality of objects as illustrated in FIG. 6, there is a high possibility that the clipped image will also be recognized as the airplane. Accordingly, when the discriminative model recognizes the clipped image as the airplane, the learning data generation apparatus re-trains the discriminative model by using the clipped image as a new target object image Do, inputs the clipped image into the re-trained discriminative model, and creates a feature map to regenerate a rectangle. Since this process for the case B makes it for the discriminative model to easily detect individual airplanes from an image that contains a plurality of airplanes, the regenerated rectangles could be rectangles representing the individual airplanes such as the rectangles 40.

On the other hand, in a case where the discriminative model does not recognize the clipped image as the airplane, it is considered that the rectangle 41 does not include the plurality of airplanes as illustrated in FIG. 6 and does not correspond to the above case B. Therefore, the learning data generation apparatus employs the original rectangle 41 and terminates this process.

As described above, in the second example embodiment, since there is a possibility that a first acquired rectangle corresponds to the case A or the case B described above, an enlargement process and a reduction process are conducted to the rectangle. In a case where the first acquired rectangle actually corresponds to the case A or the case B by these processes, it becomes possible to regenerate a rectangle with higher accuracy. On the other hand, in a case where the first acquired rectangle does not correspond to the case A or the case B, there is no problem because the original rectangle is adopted. Note that it is preferable that the number of times of performing the enlargement process and the reduction process of the rectangle is determined in advance by an experiment or the like.

Functional Configuration

Figure 7:
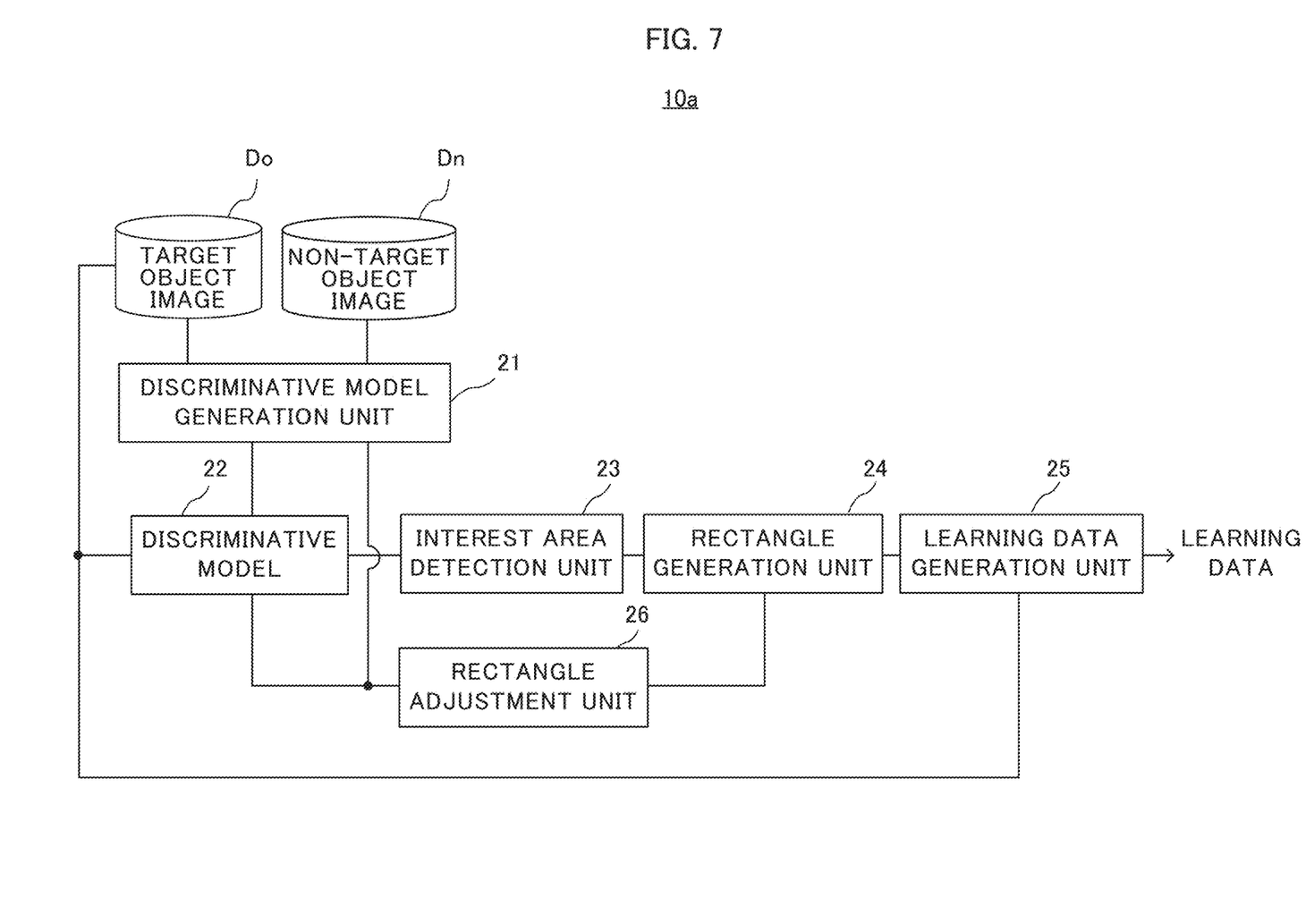
FIG. 7 illustrates a functional configuration of a learning data generation apparatus according to a second example embodiment.

FIG. 7 is a block diagram illustrating a functional configuration of a learning data generation apparatus according to the second example embodiment. A hardware configuration of the learning data generation apparatus according to the second example embodiment is the same as that illustrated in FIG. 1. As illustrated, a learning data generation apparatus 10a according to the second example embodiment includes a rectangle adjustment unit 26 in addition to the configuration of the learning data generation apparatus 10 according to the first example embodiment illustrated in FIG. 2. The rectangle adjustment unit 26 is an example for an image mask unit and an image cutout unit. The discriminative model generation unit 21, the discriminative model 22, the interest area detection unit 23, the rectangle generation unit 24, and the learning data generation unit 25 other than the rectangle adjustment unit 26 basically operate in the same manner as those units in the first example embodiment.

First, in order to correspond to the case A described above, the rectangle adjustment unit 26 performs the rectangle enlargement process. Specifically, the rectangle adjustment unit 26 generates a mask image obtained by masking a rectangle area, and inputs it to the discriminative model 22. In a case where the discriminative model 22 recognizes the mask image as a target object, the interest area detection unit 23 detects the interest area based on the mask image, and the rectangle generation unit 24 regenerates the rectangle based on the interest area.

Moreover, in order to correspond to the case B described above, the rectangle adjustment unit 26 performs the reduction process of the rectangle. Specifically, the rectangle adjustment unit 26 generates a clipped image by cutting out a rectangle area, and inputs to the discriminative model 22. When the discriminative model 22 recognizes the clipped image as a target object, the rectangle adjustment unit 26 inputs the clipped image into the discriminative model generation unit 21 to re-train the discriminative model 22, and the interest area detection unit 23 detects the interest area from the clipped image using the re-trained discriminative model, and the rectangle generation unit 24 regenerates the rectangle based on the interest area.

Learning Data Generation Process

Next, a learning data generation process will be described according to the second example embodiment. This process is conducted by the processor 13, which is illustrated in FIG. 1, executes a program prepared in advance, and operates as each element illustrated in FIG. 7.

Figure 8:
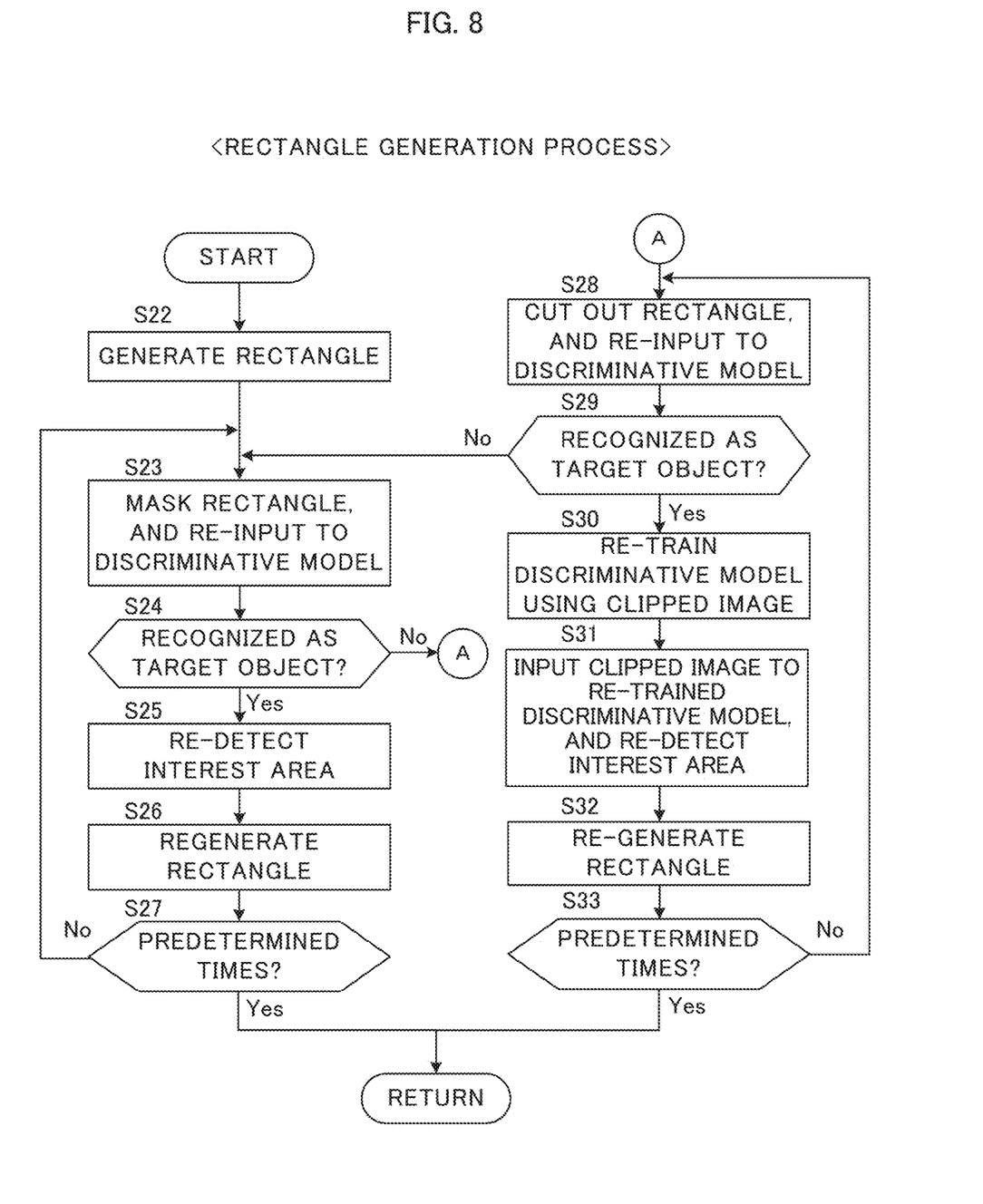
FIG. 8 is a flowchart of the learning data generation apparatus according to the second example embodiment.

A main routine of the learning data generation process of the second example embodiment is basically the same as that of the first example embodiment illustrated in FIG. 4. However, different from the first example embodiment, in the second example embodiment, the above-described the enlargement process and the reduction process of the rectangle are conducted in a rectangle generation process of step S15 illustrated in FIG. 4. FIG. 8 is a flowchart for explaining the rectangle generation process in the second example embodiment.

First, the rectangle generation unit 24 generates a first rectangle similar to the first example embodiment (step S22). Next, the enlargement process of the rectangle is conducted. First, the rectangle adjustment unit 26 generates a mask image by masking a rectangle, and re-inputs to the discriminative model 22 (step S23). Subsequently, it is determined whether or not the mask image is recognized as a target object by the discriminative model 22 (step S24). When the mask image is recognized as the target object (step S24: Yes), the rectangle is considered to correspond to the above case A. Accordingly, the interest area detection unit 23 regenerates the feature map for the mask image and re-detects the interest area (step S25), and the rectangle generation unit 24 regenerates the rectangle based on the interest area (step S26).

Next, it is determined whether or not the enlargement process of steps S23 to S26 has been performed a predetermined number of times (step S27). When the enlargement process has not been performed a predetermined number of times (step S27: No), the process returns to step S23, and steps S23 to S26 are repeated. On the other hand, when the enlargement process is performed a predetermined number of times (step S27: Yes), the process returns to the main routine illustrated in FIG. 4.

In step S24, when the mask image is not recognized as the target object, it is considered that the rectangle does not correspond to the case A. Accordingly, next, the reduction process of the rectangle is performed. Specifically, the rectangle adjustment unit 26 generates a clipped image by cutting out a rectangle, and inputs the clipped image to the discriminative model 22 (step S28). Next, it is determined whether or not the clipped image is recognized as the target object by the discriminative model 22 (step S29). When the clipped image is recognized as the target object (step S29: Yes), the rectangle is considered to correspond to the case B. Accordingly, the discriminative model generation unit 21 re-trains the discriminative model 22 using the clipped image (step S30). Next, the clipped image is input to the re-trained discriminative model, the interest area detection unit 23 regenerates a feature map for the clipped image and re-detects the interest area (step S31), and the rectangle generation unit 24 regenerates the rectangle based on the interest area (step S32).

Next, it is determined whether or not the reduction process from steps S28 to S32 has been performed a predetermined number of times (step S33). When the reduction process has not been performed the predetermined number of times (step S33: No), the process returns to step S28. On the other hand, when the enlargement process is performed a predetermined number of times (step S33: Yes), the process returns to the main routine illustrated in FIG. 4.

In step S29, when the clipped image is not recognized as the target object, the rectangle is considered not to correspond to the case B. Accordingly, the process returns to step S23. In this manner, the enlargement process and the reduction process for the rectangle are executed over the predetermined number of times, and a final rectangle is determined. After that, the process returns to the main routine illustrated in FIG. 4. Subsequent processes are the same as those in the first example embodiment.

As described above, in the second example embodiment, by performing the enlargement process and the reduction process for the first acquired rectangle, when the rectangle corresponds to the case A or the B described above, it is possible to regenerate a more accurate rectangle.

Third Example Embodiment

Figure 9:
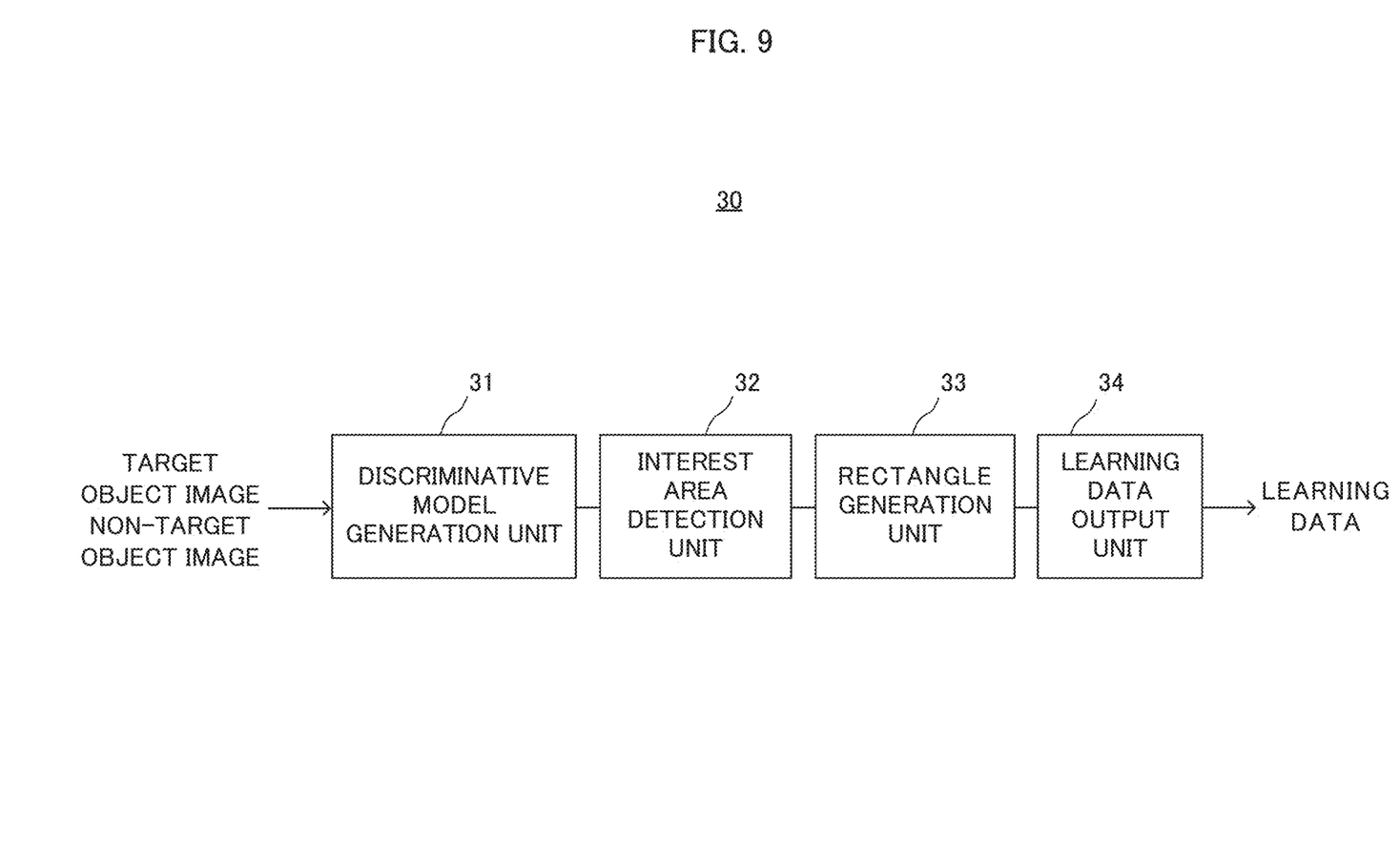
FIG. 9 illustrates a functional configuration of a learning data generation apparatus according to a third example embodiment.

Next, a third example embodiment will be described. FIG. 9 is a block diagram illustrating a functional configuration of a learning data generation apparatus 30 according to the third example embodiment. A hardware configuration of the learning data generation apparatus 30 according to the third example embodiment is the same as that illustrated in FIG. 1. The learning data generation apparatus 30 includes a discriminative model generation unit 31, an interest area detection unit 32, a rectangle generation unit 33, and a learning data output unit 34.

The discriminative model generation unit 31 generates a discriminative model that discriminates a target object included in an image using a target object image that includes a target object and to which a label of the target object is applied and a non-target object image that includes a non-target object. The interest area detection unit 32 inputs the target object image into the discriminative model and detects an interest area that is an area predicted to include the target object. The rectangle generation unit 33 generates a rectangle circumscribing the target object based on the interest area. The learning data output unit 34 outputs the learning data including the label and the rectangle of the target object.

A part or all of the example embodiments described above may also be described as the following supplementary notes, but not limited thereto.

Supplementary Note 1

1. A learning data generation apparatus comprising:
a discriminative model generation unit configured to generate a discriminative model that discriminates a target object included in an image using a target object image, which includes the target object and to which a label of the target object is applied, and a non-target object image, which includes a non-target object;
an interest area detection unit configured to input the target object image to the discriminative model, and detect an interest area which is an area that is predicted to include the target object;
a rectangle generation unit configured to generate a rectangle circumscribing the target object based on the interest area; and
a learning data output unit configured to output learning data including a label of the target object and the rectangle.

Supplementary Note 2

2. The learning data generation apparatus according to supplementary note 1, further comprising an image mask unit configured to generate a mask image by masking the rectangle in the target object image, and re-input the mask image to the discriminative model,
wherein when the mask image is recognized as the target object by the discriminative model, the interest area detection unit detects the interest area from the mask image, and the rectangle generation unit regenerates a rectangle based on the interest area detected from the mask image.

Supplementary Note 3

3. The learning data generation apparatus according to supplementary note 1 or 2, further comprising an image cutout unit configured to generate a clipped image by cutting out the rectangle in the target object image and re-input the clipped image to the discriminative model,
wherein when the clipped image is recognized as the target object by the discriminative model, the discriminative model generation unit re-trains the discriminative model using the clipped image, the interest area detection unit detects the interest area from the clipped image using the re-trained discriminative model, and the rectangle generation unit re-generates a rectangle based on the interest area detected from the clipped image.

Supplementary Note 4

4. The learning data generation apparatus according to any one of supplementary notes 1 through 3, wherein the interest area detection unit generates a feature map corresponding to the entire target object image based on a feature amount which the discriminative model generates when the target object image is input, and detects, as the interest area, an area including a value equal to or greater than a threshold value in the feature map.

Supplementary Note 5

5. A learning data generation method comprising:
generating a discriminative model that discriminates a target object included in an image using a target object image which includes the target object and to which a label of the target object is applied, and a non-target object image which includes a non-target object;
inputting the target object image to the discriminative model, and detecting an interest area which is an area that is predicted to include the target object;
generating a rectangle circumscribing the target object based on the interest area; and
outputting learning data including a label of the target object and the rectangle.

Supplementary Note 6

6. The learning data generation method according to supplementary note 5, further comprising generating a mask image by masking the rectangle in the target object image, and re-inputting the mask image to the discriminative model,
wherein when the mask image is recognized as the target object by the discriminative model, the interest area is detected from the mask image, and a rectangle is regenerated based on the interest area detected from the mask image.

Supplementary Note 7

7. The learning data generation method according to supplementary note 5 or 6, further comprising generating a clipped image by cutting out the rectangle in the target object image and re-inputting the clipped image to the discriminative model,
wherein when the clipped image is recognized as the target object by the discriminative model, the discriminative model is re-trained using the clipped image, the interest area is detected from the clipped image using the re-trained discriminative model, and a rectangle is re-generated based on the interest area detected from the clipped image.

Supplementary Note 8

8. The learning data generation method according to any one of supplementary notes 5 through 7, wherein a detection of the interest area is conducted by generating a feature map corresponding to the entire target object image based on a feature amount which the discriminative model generates when the target object image is input, and detecting, as the interest area, an area including a value equal to or greater than a threshold value in the feature map.

Supplementary Note 9

9. A recording medium storing a program, the program causing a computer to perform a process comprising:
generating a discriminative model that discriminates a target object included in an image using a target object image which includes the target object and to which a label of the target object is applied, and a non-target object image which includes a non-target object;
inputting the target object image to the discriminative model, and detecting an interest area which is an area that is predicted to include the target object;
generating a rectangle circumscribing the target object based on the interest area; and
outputting learning data including a label of the target object and the rectangle.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS 10, 10a, 30 Learning data generation apparatus
21 Discriminative model generation unit
22 Discriminative model
23 Interest area detection unit
24 Rectangle generation unit
25 Learning data generation unit

The invention claimed is:
1. A data processing apparatus comprising:
a memory storing instructions; and
one or more processors configured to execute the instructions to:
generate a discriminative model that discriminates a target object included in an image using a target object image, which includes the target object and to which a label of the target object is applied, and a non-target object image, which includes a non-target object;
input the target object image to the discriminative model, and detect an interest area which is an area that is predicted to include the target object;
generate a rectangle circumscribing the target object based on the interest area; and
output learning data including a label of the target object and the rectangle.
2. The learning data generation apparatus according to claim 1, wherein the processor is further configured to generate a mask image by masking the rectangle in the target object image, and re-input the mask image to the discriminative model,
wherein when the mask image is recognized as the target object by the discriminative model, the processor detects the interest area from the mask image, and the processor regenerates a rectangle based on the interest area detected from the mask image.
3. The learning data generation apparatus according to claim 1, wherein the processor is further unit configured to generate a clipped image by cutting out the rectangle in the target object image and re-input the clipped image to the discriminative model, wherein when the clipped image is recognized as the target object by the discriminative model,
the processor re-trains the discriminative model using the clipped image,
the processor detects the interest area from the clipped image using the re-trained discriminative model, and
the processor re-generates a rectangle based on the interest area detected from the clipped image.

4. The learning data generation apparatus according to claim 1, wherein the processor generates a feature map corresponding to the entire target object image based on a feature amount which the discriminative model generates when the target object image is input, and detects, as the interest area, an area including a value equal to or greater than a threshold value in the feature map.

5. A learning data generation method, comprising:
generating a discriminative model that discriminates a target object included in an image using a target object image which includes the target object and to which a label of the target object is applied, and a non-target object image which includes a non-target object;
inputting the target object image to the discriminative model, and detecting an interest area which is an area that is predicted to include the target object;
generating a rectangle circumscribing the target object based on the interest area; and
outputting learning data including a label of the target object and the rectangle.

6. The learning data generation method according to claim 5, further comprising generating a mask image by masking the rectangle in the target object image, and re-inputting the mask image to the discriminative model,
wherein when the mask image is recognized as the target object by the discriminative model, the interest area is detected from the mask image, and a rectangle is regenerated based on the interest area detected from the mask image.

7. The learning data generation method according to claim 5, further comprising generating a clipped image by cutting out the rectangle in the target object image and re-inputting the clipped image to the discriminative model,
wherein when the clipped image is recognized as the target object by the discriminative model, the discriminative model is re-trained using the clipped image, the interest area is detected from the clipped image using the re-trained discriminative model, and a rectangle is re-generated based on the interest area detected from the clipped image.

8. The learning data generation method according to claim 5, wherein a detection of the interest area is conducted by generating a feature map corresponding to the entire target object image based on a feature amount which the discriminative model generates when the target object image is input, and detecting, as the interest area, an area including a value equal to or greater than a threshold value in the feature map.

9. A non-transitory computer-readable recording medium storing a program, the program causing a computer to perform a process comprising:
generating a discriminative model that discriminates a target object included in an image using a target object image which includes the target object and to which a label of the target object is applied, and a non-target object image which includes a non-target object;
inputting the target object image to the discriminative model, and detecting an interest area which is an area that is predicted to include the target object;
generating a rectangle circumscribing the target object based on the interest area; and
outputting learning data including a label of the target object and the rectangle.

* * * * *